Nov. 28, 1967 A. McKEON 3,355,725

INFORMATION STORAGE MATRIX

Filed Nov. 14, 1963

INVENTOR
ALEXANDER MC KEON
By
Elmer Galbiati
ATTORNEY

United States Patent Office 3,355,725
Patented Nov. 28, 1967

3,355,725

INFORMATION STORAGE MATRIX

Alexander McKeon, Los Gatos, Calif., assignor to International Business Machines Corporation, New York, N.Y., a corporation of New York Filed Nov. 14, 1963, Ser. No. 323,735
6 Claims. (Cl. 340—174)

ABSTRACT OF THE DISCLOSURE

An information storage array which includes a plurality of bistable elements, a matrix of row and line drivers, and a logical arrangement for setting each bistable element to a first state when both the associated column drivers and the associated row drivers are activated, and for setting each bistable element to a second state when only the associated row drivers are activated. The reset cycle is eliminated using this arrangement, thereby reducing the overall memory cycle time by fifty percent and reducing the number of transients produced.

This invention relates to data storage and more particularly to data storage in a matrix of bi-stable elements.

Systems for storing information in bi-stable elements such as magnetic cores or relays are well known. In general, in such systems, before new information can be stored, a reset operation is needed to eradicate information previously stored. The present invention provides a memory matrix in which new information can be stored without first going through a reset operation to eradicate information previously stored. In the system of the present invention, when new information is stored in the matrix the only elements which change state are those elements which must change state in order to conform to the new information.

The present invention has the advantage that a minimum number of transient conditions are produced, since a minimum number of elements change state. The system of the present invention also has the advantage that the time required to place new data in the memory is reduced by approximately fifty percent due to the fact that the reset cycle is eliminated.

An object of the present invention is to provide an improved matrix of bi-stable elements.

A further object of the invention is to provide circuitry whereby new information can be stored in an array of bi-stable elements without first eradicating information previously stored therein.

A further object of the invention is to provide a matrix of bi-stable elements wherein no reset operation is needed.

Yet another object of the present invention is to provide a matrix of bi-stable elements wherein information can be stored with a minimum number of transient conditions.

The foregoing and other objects, features and advantages of the invention will be apparent from the following more particular description of preferred embodiments of the invention, as illustrated in the accompanying drawings.

Figure 1:
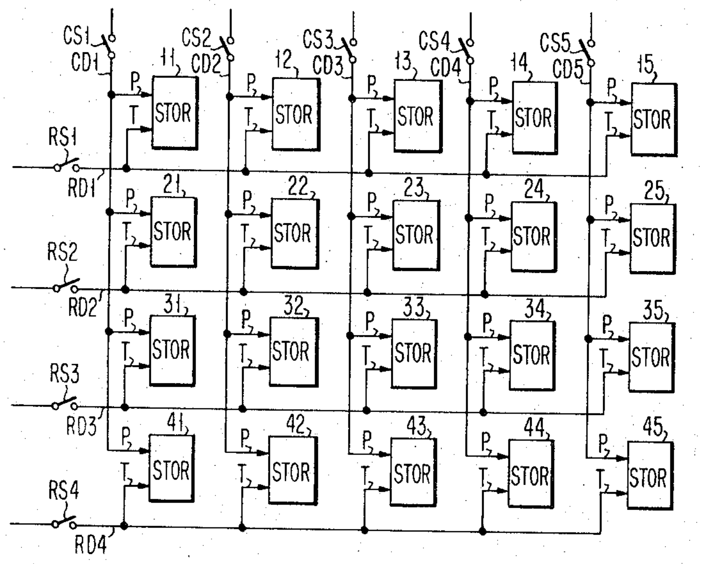
FIGURE 1 is a general overall logical block diagram of the present invention.

A preferred embodiment is shown in logical block diagram form in FIGURE 1. The preferred embodiment includes a plurality of bi-stable storage elements designated 11 to 45 arranged in a matrix which has five columns and four rows. Each row and each column of the matrix has a drive line and an input switch associated therewith. The drive lines which are associated with the rows are respectively designated RD1 to RD4, and the switches which are associated with the rows are respectively designated RS1 to RS4. The drive lines which are associated with the columns are respectively designated CD1 to CD5 and the switches associated with the columns are respectively designated CS1 to CS5. Each of the bi-stable storage elements 11 to 45 has two inputs, designated P and T. As shown, all of the P inputs are connected to the associated column drive lines, and all of the T inputs are connected to the associated row drive lines. For convenience, in the following discussion, the two states of each bi-stable storage element will be respectively designated the "zero" state and the "one" state. It should be understood that these are arbitrary designations which could be reversed.

For reasons which will be explained in detail later, in order to store a "one" bit in any particular bi-stable storage element, both the P and the T inputs of that element must be simultaneously activated. Hence, in order to store a "one" in a particular bi-stable storage element, both the associated column switch and the associated row switch must be closed. For example, in order to store a "one" in bi-stable element 23, both switches CS3 and RS2 must be closed. In order to reset any bi-stable storage element to the "zero" state, only the T input need be activated. For example, element 23 can be reset to the "zero" state by merely closing switch RS2.

The system operates as follows: A particular array of bits is stored in one row of the matrix by simultaneously closing the row switch associated with the particular row and each of the column switches associated with positions wherein a "one" is to be stored. Whatever the previous state of the bi-stable storage elements, the only elements that change state are those which need change state in order to represent the new information. For example, in order to store the array "11010" in the second row of the matrix, switches RS2, CS1, CS2, and CS4 are simultaneously closed. If the array of bits "10110" had previously been stored in row 2, closing the above switches:

(a) Activates both inputs to element 21; since element 21 is already in the "one" state, it does not change state.

(b) Activates both inputs to element 22; since element 22 was previously in the "zero" state, it now changes from the "zero" state to the "one" state.

(c) Activates only the T input to element 23; since element 23 was previously in the "one" state, it now changes from the "one" state to the "zero" state.

(d) Activates both inputs to element 24; since element 24 was previously in the "one" state, it does not now change state.

(e) Activates only the T input to element 25; since element 25 was previously in the "zero" state, it does not change state.

Figure 2:
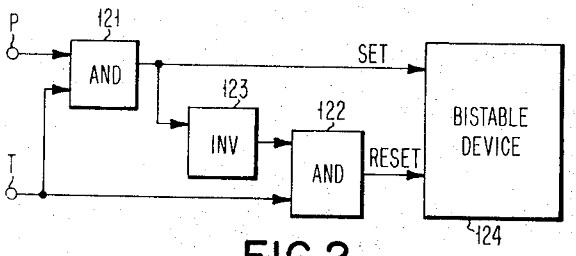
FIGURE 2 is a logical block diagram of the equivalent logic within each element of the matrix.

FIGURE 2 shows in block diagram form the logical operations performed by each of the bi-stable storage elements 11 to 45. The logical representation includes two AND circuits 121 and 122, a logical inverter circuit 123, and a bi-stable device 124. Bi-stable device 124 has two inputs respectively designated the "set" input and the "reset" input. Activation of the set input forces bi-stable device 124 to a first state, hereinafter designated the "one" state and activation of the reset input forces bi-stable device 124 to a second state, hereinafter designated the "zero" state. As in FIGURE 1, the two inputs are designated P and T. The P input provides a signal to AND circuit 121 and the T input provides signals to both AND circuits 121 and 122. The output of AND circuit 121 activates the input of inverter 123, and the output of inverter 123 supplies a second input of AND circuit 122.

The output of AND circuit 121 also activates the set input of bi-stable device 124, and the output of AND circuit 122 activates the reset input of bi-stable device 124.

The logic shown in FIGURE 2 performs the function previously ascribed to each of the bi-stable storage elements 11 to 45. When both the P and the T inputs are activated, the output of AND circuit 121 is activated, thereby activating the set input of bi-stable device 124. This forces bi-stable device 124 to the "one" state. Whenever the output of AND circuit 121 is activated, the input of inverter 123 is activated; hence, the output of inverter 123 is inactive, and one of the inputs of AND circuit 122 is inactive. If only input P is activated, neither the output of AND circuit 121 nor the output of AND circuit 122 is activated; hence, the state of bi-stable device 124 remains unchanged. If only the T input is activated, the output of AND circuit 121 is inactive; hence, the output of inverter 123 is active. As a result the output of AND circuit 122 is activated, thereby activating the reset input of bi-stable device 124 and forcing element 124 to the "zero" state. In summary, if only the P input is activated, neither the set nor the reset input of bi-stable device 124 is activated. If only the T input is activated, the reset input of bi-stable device 124 is activated, and if both the P and the T inputs are activated, the set input of bi-stable device 124 is activated.

In the particular preferred embodiment shown herein, each of the elements 11 to 45 comprises a bi-stable mercury wetted reed relay. Such a relay is shown diagrammatically in FIGURE 3. The relay includes contact points 301, control coils 302 and 303 and a biasing magnet 304. Points 301 can be opened and closed by the magnetic field generated by current in coils 302 and 303. Current in coil 302 generates a magnetic field which counteracts the effect of biasing magnet 304 and which tends to open points 301, and current in coil 303 generates a magnetic field which tends to close points 301. The relay is polarized by means of permanent magnet 304 whereby once opened the contact points remain open and, once closed, the contact points remain closed. The number of turns on coils 302 and 303 is arranged so that the magnetomotive force generated by coil 303 can overcome the magnetomotive force generated by coil 302 so that when both coils 302 and 303 are simultaneously activated, points 301 are moved to the closed position. For ease of illustration in later drawings, coils 302 and 303 are respectively designated as "pick" and "trip" coils by the respective designations "P" and "T." The details of the relay are not shown or explained herein, since such relays are well known in the art and commercially available. For example, they can be purchased from C. P. Clare Co., 3101 Pratt Blvd., Chicago 45, Illinois, as a bi-stable relay type number HGS 2Y 1022.

Figure 3:
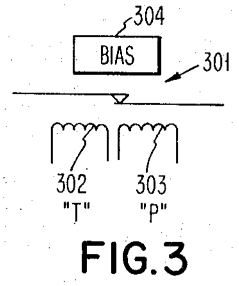
FIGURE 3 is a schematic diagram of a latching reed relay.
Figure 4:
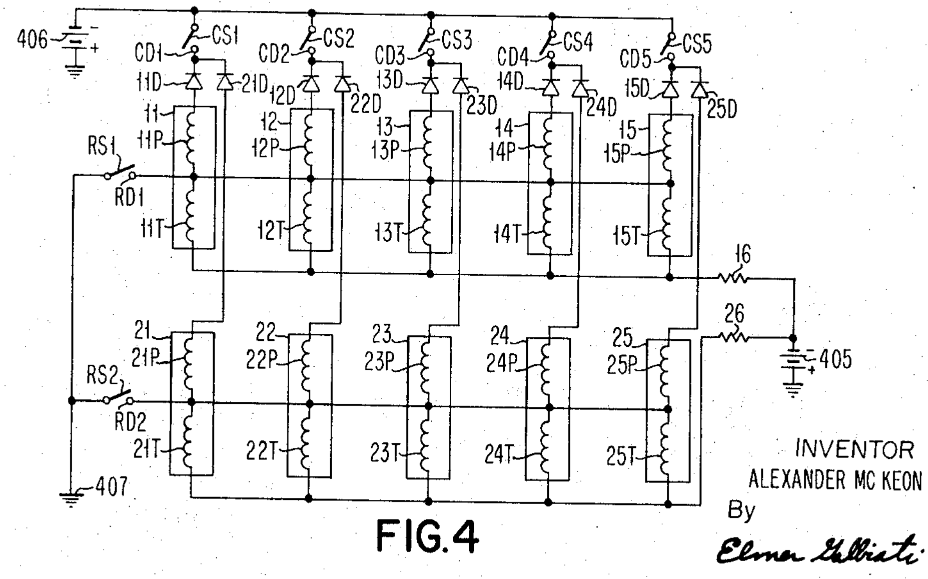
FIGURE 4 is a circuit diagram showing the connections necessary to connect the relay shown in FIGURE 3 in accordance with the present invention.

The manner in which mercury wetted relays shown in FIGURE 3 are connected in a matrix array in accordance with the present invention is shown in FIGURE 4. FIGURE 4 is similar to FIGURE 1 except that bi-stable storage elements 11 to 45 are shown in greater detail. Furthermore, since each of the rows in the matrix is identical, only the first and second rows are shown. Rows 3 and 4 (which are not shown) are identical to the two rows which are shown. It should be particularly noted that FIGURE 1 is a logical block diagram whereas FIGURE 4 is an actual circuit diagram.

As shown in FIGURE 3, each of the bi-stable storage elements 11 to 45 has two coils respectively designated by the letters P and T to designate the pick and the trip coils. For example, element 11 has a pick coil 11P and a trip coil 11T. In each row all of the trip coils of the bi-stable storage elements in that row are connected in parallel between the respective row drive line and a voltage source. For example, coils 11T, 12T, 13T, 14T and 15T are connected in parallel between row drive line RD1 and the voltage source designated 405. A resistor 16 is connected in the circuit to limit the amount of current which can flow. This resistor is needed to insure that the magnetomotive force generated by the various pick coils P can overcome the magnetomotive force generally by the associated trip coils T, as previously discussed. The pick coils of the various bi-stable storage elements in each column are connected between the associated column drive line and the row drive line associated with each coil. For example, pick coil 11P is connected between column drive line CD1 and row drive line RD1 and pick coil 21P is connected between column drive line CD1 and row drive line RD2. A diode is connected in series with each pick coil to prevent back circuits. For example, diode 11D is connected in series with coil 11P and diode 21D is connected in series with coil 21T.

All of the column drive lines are connected to a voltage source through their associated column switches CS1 to CS5. All of the row drive lines are connected to ground 407 through their associated row switches RS1 to RS4.

When one of the column switches CS1 to CS5 is closed, none of the pick coils in the associated column is activated unless one of the row switches RS1 to RS5 is also closed. For example, pick coil 11P is not activated when column switch CS1 is closed. In order to activate pick coil 11P, both column switch CS1 and row switch RS1 must be closed. Each of the trip coils in a particular row is activated when the associated row switch RS1 to RS5 is closed irrespective of whether the associated column switch is closed. For example, trip coil 11T is activated when row switch RS1 is closed, irrespective of whether or not column switch CS1 is closed.

As previously explained with respect to FIGURE 3, the relays 11 to 45 are designed so that if both the pick and the trip coil of a relay are activated, the relay is picked; that is, the relay points 301 are closed. Likewise, if only the pick coil is activated, the relay points are closed. If only the trip coil is activated, the relay points are opened. Once opened or closed, the relay points remain in the respective position.

The circuit shown in FIGURE 4 operates as follows: If both the column switch and the row switch associated with a particular relay is closed, both the pick and the trip coils of the particular relay are activated, and hence, the relay points are closed. If only the row switch associated with a particular relay is closed, only the trip coil of the relay is activated, and the associated contact points are opened. If only the column switch associated with the particular relay is closed, neither the pick nor the trip coil is activated, and there is no change in the state of the relay.

Hence, when a new array of bits is stored in a row of the matrix, only those relays which need change state in order to represent the new array are affected. In this manner, a minimum number of transients are created in the output circuits (i.e., in the circuitry which is attached to relay points 301). Furthermore, no separate reset operation is needed before new information is stored.

While the invention has been particularly shown and described with reference to a preferred embodiment thereof, it will be understood by those skilled in the art that various changes in the form and details may be made therein without departing from the spirit and scope of the invention.

What is claimed is:

1. An information storage matrix comprising:

a plurality of bi-stable storage elements arranged in a matrix having rows and columns, each of said bi-stable storage elements having first and second stable states, first input means for setting said element to said second stable state when only said first input means is activated, and second input means for setting said element to said first stable state when said first input means is activated, a row driver associated with each row of said matrix for simultaneously activating all of the first input means of the bi-stable elements in the associated row, a column driver associated with each column of said matrix, and means for activating the second input means of a particular bi-stable storage element when both the associated column driver and the associated row driver are activated, whereby a bi-stable storage element is set to said second state when only the associated row driver is activated and whereby a bi-stable storage element is set to said first stable state when both the associated row driver and the associated column driver are activated.

2. An information storage system comprising:

a plurality of bi-stable storage elements arranged in a matrix having rows and columns, each of said bi-stable storage elements having first and second stable states, separate row drive means associated with each row of said matrix and separate column drive means associated with each column of said matrix, means associated with each bi-stable storage element for setting said element to said first stable state when both the associated column drive means and the associated row drive means are activated, and means associated with each bi-stable storage element for setting said bi-stable storage element to said second stable state when only the associated row drive means is activated, whereby a bi-stable storage element is set to said second state when only the associated row drive means is activated and whereby a bi-stable storage element is set to said first stable state when both the associated row drive means and the associated column drive means are activated.

3. An information storage system comprising:

a plurality of relays arranged in rows and columns, each of said relays having a set of bi-stable contact points with a stable first position and a stable second position, separate row drive means associated with each row and separate column drive means associated with each column, means associated with each relay for setting said relay to said first stable state when both the associated column drive means and the associated row drive means are activated, and means associated with each relay for setting said relay to said second stable position when only the associated row drive means is activated, whereby a relay is set to said second stable position when only the associated row drive means is activated and whereby a relay is set to said first stable position when both the associated row drive means and the associated column drive means are activated.

4. An information storage system comprising:

a plurality of relays arranged in rows and columns, each of said relays having a set of bi-stable contact points, said contact points having a stable first position and a stable second position, first input means operative when activated to generate a magnetomotive force to move said contact points to said first position, and second input means operative when activated to generate a magnetomotive force to move said contact points to said second position, said second means being adapted to generate more magnetomotive force than said first means whereby said points are moved to said second position when both said first input means and said second input means are simultaneously activated, separate row drive means associated with each row and separate column drive means associated with each column, means associated with each relay for activating said first input means whenever the associated row drive means is activated and means associated with each relay for activating said second input means whenever both the associated row drive means and the associated column drive means are activated, whereby said contact points are set to said second stable state when only the associated row drive means is activated and whereby said contact points are set to said first stable state when both the associated row drive means and the associated column drive means are activated.

5. An information storage system comprising:

a plurality of storage elements arranged in rows and columns, each of said storage elements having a first stable state and a second stable state, first input means operative when activated to move said element to said first position, and second input means operative when activated to move said element to said second position, said second means being adapted to move said element to said second position when both said first means and said second means are simultaneously activated, separate row drive means associated with each row and separate column drive means associated with each column, means associated with each bi-stable element for activating said first input means whenever the associated row drive means is activated, and means associated with each bi-stable element for activating said second input means whenever both the associated row drive means and the associated column drive means are activated, whereby a bi-stable element is set to said second stable state when only the associated row drive means is activated and whereby a bi-stable element is set to said first stable state when both the associated row drive means and the associated column drive means are activated.

6. An information storage system comprising:

a plurality of relays arranged in rows and columns, each of said relays having a set of bi-stable contact points, said contact points having a stable first position and a stable second position, first input means operative when activated to generate a magnetomotive force to move said contact points to said first position, and second input means operative when activated to generate a magnetomotive force to move said contact points to said second position, said second means being adapted to generate more magnetomotive force than said first means whereby said points are moved to said second position when both said first input means and said second input means are simultaneously activated, separate row drive means associated with each row and separate column drive means associated with each column, means associated with each relay for activating said first input means whenever the associated row drive means is activated and means associated with each relay for activating said second input means whenever both the associated row drive means and the associated column drive means are activated, whereby when a row drive means and one or more column drive means are activated in order to store a new array of bits in a particular row of said relays, the only relays which change state are those relays which need change state in order to represent the new data.

References Cited

UNITED STATES PATENTS

| | | | |
|---|---|---|---|
| 2,695,396 | 11/1954 | Anderson | 340—166 X |
| 3,210,731 | 10/1965 | James et al. | 340—166 |

THOMAS B. HABECKER, *Primary Examiner.*

NEIL C. READ, *Examiner.*

D. J. YUSKO, *Assistant Examiner.*